US007044741B2

(12) United States Patent
Leem (10) Patent No.: US 7,044,741 B2
(45) Date of Patent: May 16, 2006

(54) ON DEMAND CONTENTS PROVIDING METHOD AND SYSTEM

(76) Inventor: Young-Hie Leem, 1018-23, Sadang-Dong, DongJak-Gu, Seoul, 156-091 (KR)

( * ) Notice: Subject to any disclaimer, the term of this patent is extended or adjusted under 35 U.S.C. 154(b) by 0 days.

(21) Appl. No.: 10/276,911

(22) PCT Filed: May 19, 2001

(86) PCT No.: PCT/KR01/00829

§ 371 (c)(1),
(2), (4) Date: May 14, 2003

(87) PCT Pub. No.: WO01/91028

PCT Pub. Date: Nov. 29, 2001

(65) Prior Publication Data

US 2004/0044473 A1    Mar. 4, 2004

(30) Foreign Application Priority Data

May 20, 2000    (KR)    ............................. 2000-27304

(51) Int. Cl.
*G09B 19/00*    (2006.01)
(52) U.S. Cl. ...................... 434/156; 434/185; 434/350; 434/362
(58) Field of Classification Search ............... 434/118, 434/156, 157, 169, 185, 307 R, 308, 322, 434/323, 350, 362, 365; 704/201, 260, 270, 704/3, 250; 707/1, 103 R; 345/709; 463/19; 717/115; 84/483.2

See application file for complete search history.

(56) References Cited

U.S. PATENT DOCUMENTS

| 5,778,367 | A | | 7/1998 | Wesinger, Jr. et al. |
| 5,884,263 | A | * | 3/1999 | Aaron et al. ................. 704/270 |
| 6,023,692 | A | | 2/2000 | Nichols |
| 6,026,386 | A | | 2/2000 | Lannert et al. |
| 6,302,695 | B1 | * | 10/2001 | Rtischev et al. ............ 434/157 |
| 6,358,053 | B1 | * | 3/2002 | Rosenfield et al. ......... 434/156 |
| 6,434,568 | B1 | * | 8/2002 | Bowman-Amuah ..... 707/103 R |
| 6,539,354 | B1 | * | 3/2003 | Sutton et al. ................ 704/260 |
| 6,741,833 | B1 | * | 5/2004 | McCormick et al. ........ 434/350 |
| 6,751,439 | B1 | * | 6/2004 | Tice et al. ................... 434/350 |
| 6,760,697 | B1 | * | 7/2004 | Neumeyer et al. .......... 704/201 |
| 2002/0007265 | A1 | * | 1/2002 | Yamada ......................... 704/3 |
| 2002/0086269 | A1 | * | 7/2002 | Shpiro ........................ 434/156 |
| 2002/0111934 | A1 | * | 8/2002 | Narayan ........................ 707/1 |
| 2002/0115044 | A1 | * | 8/2002 | Shpiro ........................ 434/156 |
| 2002/0118220 | A1 | * | 8/2002 | Lui et al. ..................... 345/709 |
| 2002/0150871 | A1 | * | 10/2002 | Blass et al. ................. 434/185 |
| 2002/0183108 | A1 | * | 12/2002 | Baeg ............................ 463/19 |
| 2003/0049592 | A1 | * | 3/2003 | Park ............................ 434/322 |

(Continued)

FOREIGN PATENT DOCUMENTS

JP        05-313862        11/1993

*Primary Examiner*—Joe H. Cheng
(74) *Attorney, Agent, or Firm*—Brooks Kushman P.C.

(57) ABSTRACT

A system for providing customized audio content, based on a client-server communication network, includes a means for producing a plurality of audio content with different attributes; and a content-providing server for converting the plurality of audio content into digital audio files that are stored with and linked to the corresponding script. A contents file with specific attributes is provided via the communication network to a user after being requested.

21 Claims, 5 Drawing Sheets

U.S. PATENT DOCUMENTS

2004/0015846 A1* 1/2004 Haisraeli .................... 717/115
2004/0054525 A1* 3/2004 Sekiguchi ................... 704/205
2004/0074376 A1* 4/2004 Varme ....................... 84/483.2
2004/0253565 A1* 12/2004 Kim ........................... 434/156

* cited by examiner

ON DEMAND CONTENTS PROVIDING METHOD AND SYSTEM

CROSS-REFERENCE TO RELATED APPLICATIONS

This application claims the benefit of priority of the national phase under 35 U.S.C. 371 of P.C.T. International Application No. PCT/KR01/00829 which has the International filing date of May 19, 2001, and which also claims the priority of Korean Patent Application No. 2000-27304, filed May 20, 2000, the entire disclosures of each of the above applications are hereby incorporated by reference.

TECHNICAL FIELD

The present invention relates to system and method for providing digital audio data useful for learning a language over the Internet. More particularly, the present invention is related to a system and method in which a script is recorded, encoded into language-learning digital audio files having different language, voice, and speed attributes and stored on a server. The script files in the various languages have equivalent meaning to each other and are executed on a user's computer which may or may not be networked. The user may be with digital content from the server over the Internet tailored to the user's language, educational level, taste or the like.

BACKGROUND ART

In a conventional method of learning a language, language-learning content is provided to a user with a single voice and speaking rate corresponding to one script. The speaking rate of such methods is typically at a normal rate used by native language speakers. Therefore, although a person can use a computer equipped with a repeat play function and internet for language-learning, such a user may not easily comprehend a foreign language using the conventional audio content provided with the same voice attributes. Moreover, users may be easily bored with repeatedly listening to audio content having the same voice attributes. In real world situations such as when a person meets foreign native speakers in business, native speakes may have various kinds of voices, accents and pronunciations. Accordingly, it is more effective to practice listening to other voices at each repetition so as to be familiar with such voices. However, the conventional foreign language-learning materials do not provide such functionality. When conventional technology is used for providing audio content for business related applications, the personal characteristics of users is not considered resulting in static or inflexible content.

In order to provide language-learning content customized for a user, the content needs to be made and provided with the same script but in a manner that takes into consideration each users learning condition and preferences. It is also necessary to provide various types of content to a user in a customized manner that is transmitted in real time at any place and time selected by the user. The off-line manufacturing of various content tends to result in an economic loss being expensive and creating little income. Moreover, even if such losses are ignored, it is impossible to provide customized content with desired format at a desired time and place in real time, when factors such as cost, time, distance, and the like are taken into consideration.

There are many web sites that provide content for learning foreign languages through conventional technology. However, such web sites typically provide content that has already been distributed through various media such as audiotape or CD. Therefore, such web sites do not provide customized content suitable for each learner.

There is also another prior art technology that regulates voice play rate while playing foreign language-learning content with an audio player. However, this technology requires installation of a program or mounting of a module on a user's terminal thereby adding additional costs. Since the content is specific to this technology and not in a unified standard file format, additional costs are incurred for manufacturing digital content. Therefore, this prior art technology has mass production, distribution and use of customized content limitations. In addition, since this technology modulates speech rate by means of a program during playback, deterioration of the sound quality is inevitable. Moreover, the user continuously listens to the same voice at each repetition, making the user feel bored while not recreating the usual conversational environment.

Accordingly, there exists a need for an improved audio content-providing systems that enable a service provider to provide various kinds of content at a lower cost while allowing a user to access customized content for language-learning.

DISCLOSURE OF INVENTION

The present invention solves the problems of the prior art by providing a customized content-providing system. The content-providing system of the invention includes a method and a medium storing a program executing the method which provides customer-oriented dynamic content-providing technology for learning a foreign language. Moreover, the invention allows the user to configure learning content in a manner suitable to the user's language level, conditions, and the like. Accordingly, individuals may learn foreign languages easily, at lower cost, in a pleasant and convenient way.

A first object of the present invention is to provide a technique in which speech rate is adjusted while providing the original sound of the content without installation of a program or device on the user's terminal for adjustment of the speech rate of a digital audio content.

A second object of the present invention is to provide a technique for customizing digital audio content corresponding to a script to be recorded for language-learning. The digital audio content will have various voice attributes, play rate attributes, and methods of playback, to be suitable for level and conditions of a user (learner).

A third object of the present invention is to provide digital audio content in at least one language through an interface (e.g. homepage), corresponding in meaning to the same script to be recorded for language-learning set forth above for the second object.

A fourth object of the present invention is to make audio content easier to use at a lower cost so that many kinds of digital audio content having various attributes can be made to be provided with the corresponding scripts having the same meaning but different languages in a customized way like the second technical object.

To achieve the above objects, one embodiment of the present invention provides a system for providing customized audio content for language-learning, based on a client-server communication network. The system of this embodiment comprises:

a means for producing a plurality of the audio content files having different attributes, each of the audio content files being formed by recording a script (of specific material) into at least one audio signal that is classified by its attributes; and at least one content-providing server for converting the plurality of said audio content into digital audio files, the server storing the digital audio files with the corresponding script file so that the digital audio files and the script file are linked to each other, and providing the audio content file with specific attributes requested by a logged-on user through a content-providing means.

The content-providing server preferably comprises:

a plurality of content database ("DB") including the digital audio files with different attributes to be played in an on-line environment through a communication network and/or in an off-line environment by downloading the corresponding script files linked to the audio files by the content-providing means through the communication network;

a DB server ("DBMS") for retrieving the requested data from the content DB; and a web/DB linking module which receives user selection information for the audio content file through the content-providing means, and retrieves the audio content file in an on-line/off-line playable format with the attributes corresponding to the user's selection from the content DB to thereby link to the content-providing means.

In another embodiment of the present invention, a method of providing customized content for language-learning, based on a client-server communication network is provided. The method of this embodiment comprises:

(a) producing a plurality of audio content files having different attributes by recording a script (of specific material) into at least one audio signal, wherein for a given script different audio content having different attributes regarding language, voice, and speed of speech;

(b) building a content DB by converting the plurality of the audio content files into digital audio files to be played in an on-line environment through the communication network and/or in an off-line environment by downloading the digital audio files by the content-providing means through the communication network and storing the digital audio files with the corresponding script files to be linked to each other; and (c) retrieving an audio content file with the specific attributes requested by a logged-on user through the content-providing means from the content DB.

In another embodiment of the present invention, a computer-readable storage medium storing a source program to direct a computer, based on a client-server communication network is provided. The stored program of this embodiment performs the method comprising:

producing a plurality of audio content with different attributes, each audio content being formed by recording a script (of specific material) into at least one audio signal, wherein for a given script different audio content having different attributes regarding language, voice, and speed of speech;

building a content DB by converting the plurality of the audio content into digital audio files to be played in an on-line environment through the communication network and/or in off-line environment resulting from downloading through the communication network, and storing the digital audio files together with the corresponding script files to be linked to each other in the content-providing means; and retrieving the content with the special attributes requested by a user in log-on through the content-providing means from the content DB.

The content-providing means preferably comprises a GUI (Graphic User Interface) based content-providing web document (homepage) file or text-based content-providing display file. The content-providing server comprises a GUI-based web server or a text-based telnet server. The content-providing web document encompasses the entire web document to be provided via wired or wireless Internet. The audio content producing means includes the scripts to be recorded and an apparatus for recording the scripts into audio signals. The content-providing means includes a customized homepage to provide a specific customized content to which a user has recently accessed.

In another embodiment of the present invention, a method for obtaining a large amount of audio content at low cost is provided. In one variation of this embodiment, the method comprises the steps of:

providing users with a user-produced content registering means through the web site;

producing audio content files requested by the web site, the audio content files being produced by the users;

uploading the audio content files produced by the user with an uploading means on the web site; and registering received audio content files in the corresponding content DB by the administrator of the web site;

linking the received audio content files to the corresponding content-providing web document by the administrator of the web site.

In another variation of this embodiment, the method comprises the steps of:

preparing a main site;

assembling local companies located in various countries, each local company builds a local branch site using the present invention and building a version of a content DB in their respective native languages, each version corresponding to the meaning of the content of an English version built by the main site; and providing a user with content in various languages by linking to user selection items in each local web site.

In another embodiment of the present invention, a method to be used in the music field is provided. The method of this embodiment comprises the steps of:

building versions of a music content DB consisting of a plurality of music document files (which includes files of musical notes and song words) in various language, the meanings of whose song words are equal to each other; and a plurality of corresponding music audio files to be played in an on-line or off-line mode, the music audio files being produced by recording a performance of the music document files by various performance means such as musical instruments or voices;

building a chant content DB that contains performances with various voices with or without musical instruments of the 'song words' with only rhythm and beat and not melody, the performances being recorded in on-line and/or off-line playable digital audio file formats;

linking the chant content DB and the music content DB to each other in a music content-providing web documents; and providing users with the customized music content through the music content-providing web document.

BEST MODES FOR CARRYING OUT THE INVENTION

The objects and characteristics of the present invention will be more easily understood with reference to the accompanying drawings and detailed description below.

Each term used in this specification is specially selected for the convenience of explanation. Therefore, the terms in this specification should be interpreted considering their substantial functions.

Figure 1A:
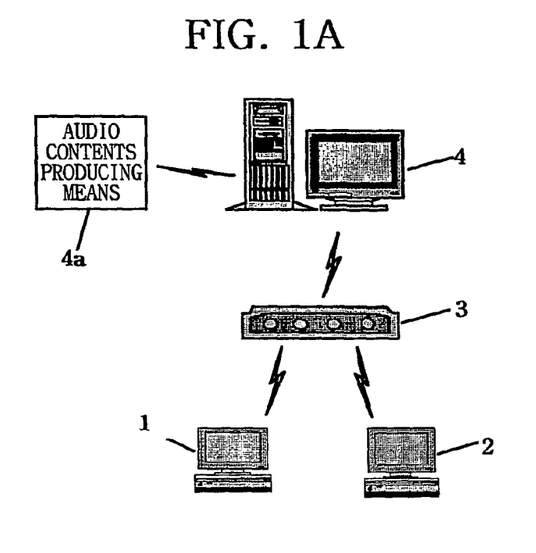
FIG. 1a shows a configuration of a content-providing system according to an embodiment of the present invention.

FIG. 1a shows a configuration of a content-providing system according to an embodiment of the present invention. The content-providing system of this embodiment comprises at least one content-providing server 4 for providing audio content, an audio content producing means (unit) 4a, user terminals 1 and 2 to receive the content, and a communication network 3 to connect the server and the user terminals for exchange of data.

Preferably, the content-providing server 4 comprises the following hardware—a computer server, network equipment, and a high rate Internet connection, and a server operating system ("OS") such as UNIX and NT, a communication protocol (TCP/IP), a web server program (such as IIS), a database ("DB") server program (a DBMS such as oracle), a streaming server program for providing streaming-type content, and a script computer language program such as ASP and PHP supporting interaction of the web and DB.

The terminal is provided with a means for retrieving content information from the server through a wired/wireless communication network, transferring control information required for the server, and a means for playing the content received from the server either in an on-line or off-line manner, i.e., browser, Real Audio, Window Media Player, Win Amp or the like, and a communication means that includes network equipment and a communication program. Wireless communication terminals such as a PCS phone, a cellular phone, a PDA, a smart phone and IMT-2000, etc., an Internet TV, an Internet set-top box as well as computers may be adopted as the terminals.

The communication network includes wired or wireless computer communication network. The wireless user terminals 1 and 2 communicate with the server through a gateway unit (not shown) such as WAP (Wireless Application Protocol) server, etc. The audio content producing means (unit) 4a includes various kinds of learning materials (scripts) to be recorded, and an apparatus for recording the scripts into audio signals such as recorders and the like. For convenience, FIG. 1a shows only one server performing all the functions for providing content. It will be understood by those skilled in the art, that the server may consist of a plurality of servers including an interface server (a web server), a content (file) server, a DB server, a streaming server, a searching engine server, and the like, in accordance with a function performed by each server. A control module pro1 and a DB server pro2 are integrally combined into the server 4 in FIG. 4, however, it is understood for those skilled in the art, that they may be distributed by at least two computers in an actual case.

Functional configuration elements of the present invention are mainly claimed as 'steps' or 'modules' in methods or programs, and as 'modules' or 'means' in systems.

Figure 4:
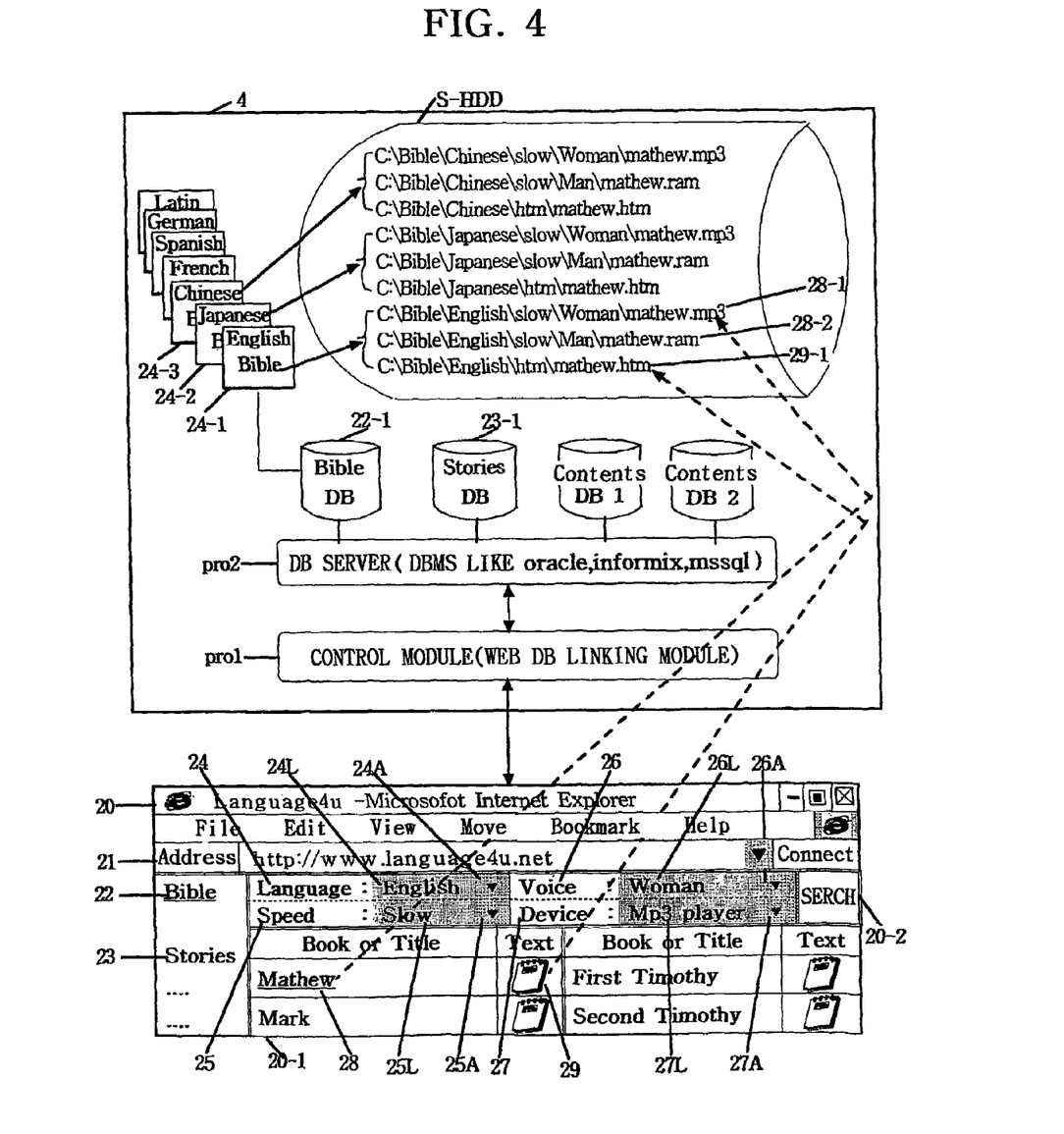
FIG. 4 illustrates the process of dynamically producing a content-providing web page.

The server executes a method of the present invention by computer programs. The computer programs stored in a computer storage medium (not shown) are called by a server's CPU (not shown), and uploaded into main memory, RAM (not shown), of the sever to be executed. A homepage as illustrated in FIG. 4, links the control module pro1 and the content DB.

The storage medium includes a computer-readable storage medium such as ROM, RAM, a CD-ROM, magnetic tapes, a hard disk, floppy disks, and optical data storage devices, and a means implemented in the form of carrier waves, for example, transmission via Internet. Moreover, the computer programs which are in computer-readable codes may be distributed and stored in several computer systems, which are connected with one another through a network.

Specifically, the computer program is encoded by a hypertext mark-up language such as XML and HTML, and a script language such as java, asp, php and pearl. However, the computer program may be embodied by various languages supported by the operating system, the server and the user terminal, as well as, state of the art programming. Preferably, the computer program and the content may be adapted to support wireless communication with wireless user terminals.

Server administrators build and administer the web site, content DB, and user DB. Moreover, the operation of the administrators is deemed to be included in the function of the server so that explanation thereof will be omitted hereafter.

Figure 1B:
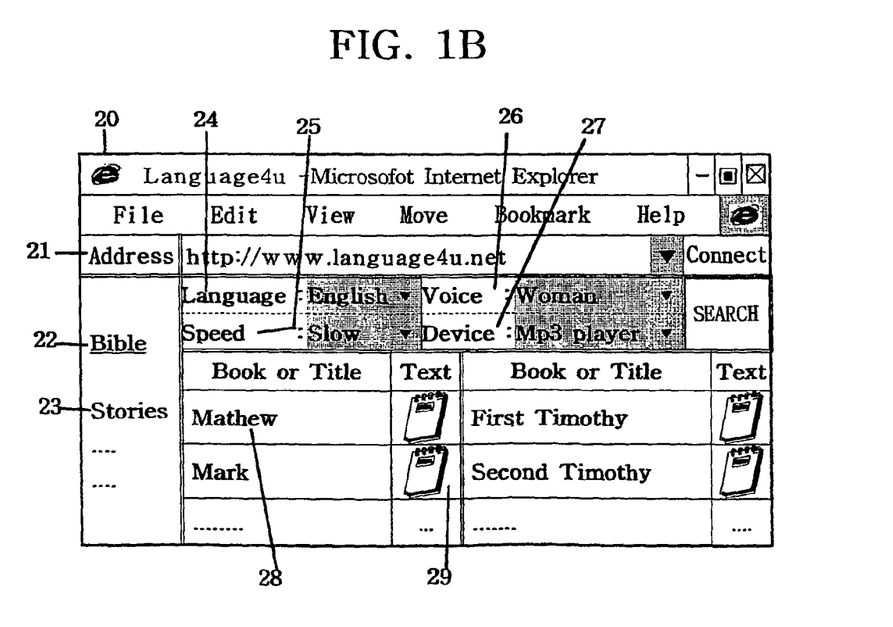
FIG. 1b shows an example of a content-providing web page provided on a web site in accordance to the present invention.

FIG. 1b illustrates an example of the configuration of web documents for providing the content according to the present invention. When a user connects with a web server by filling the address of a web server in an address input box 21 of a web browser 20 and transmitting the same via Internet 3, a homepage including a menu page of the content DB and corresponding content-providing web documents 20-1 is downloaded, and displayed on a monitor of the user computer 1 and 2 as shown in FIG. 1b.

The user may be provided with specific content by choosing the desired content-providing web documents in the above content DB menu home pages that are classified according to categories. As shown in FIG. 1b, the content DB menu page in which the content DB menu icons 22 and 23 are aligned are displayed on the left frame in the web browser of the user computer. The content-providing web documents 20-1 corresponding to the selected icon of the content DB menu are on the right frame. Various configurations of the menu page may be used such as a category-type with or without a key word searching means. User selection items 24 through 27 are located at the upper part of the content-providing web document. A plurality of content buttons 28 indicating content titles and script buttons 29 are located at the lower part of the content-providing web document. The content buttons 28 are linked to audio content files provided by the user making selections for items 24 through 27. The audio content files have different voices, different speech rates, and different playable formats corresponding to the same script. Additional details regarding FIG. 1b are set forth below.

Figure 2:
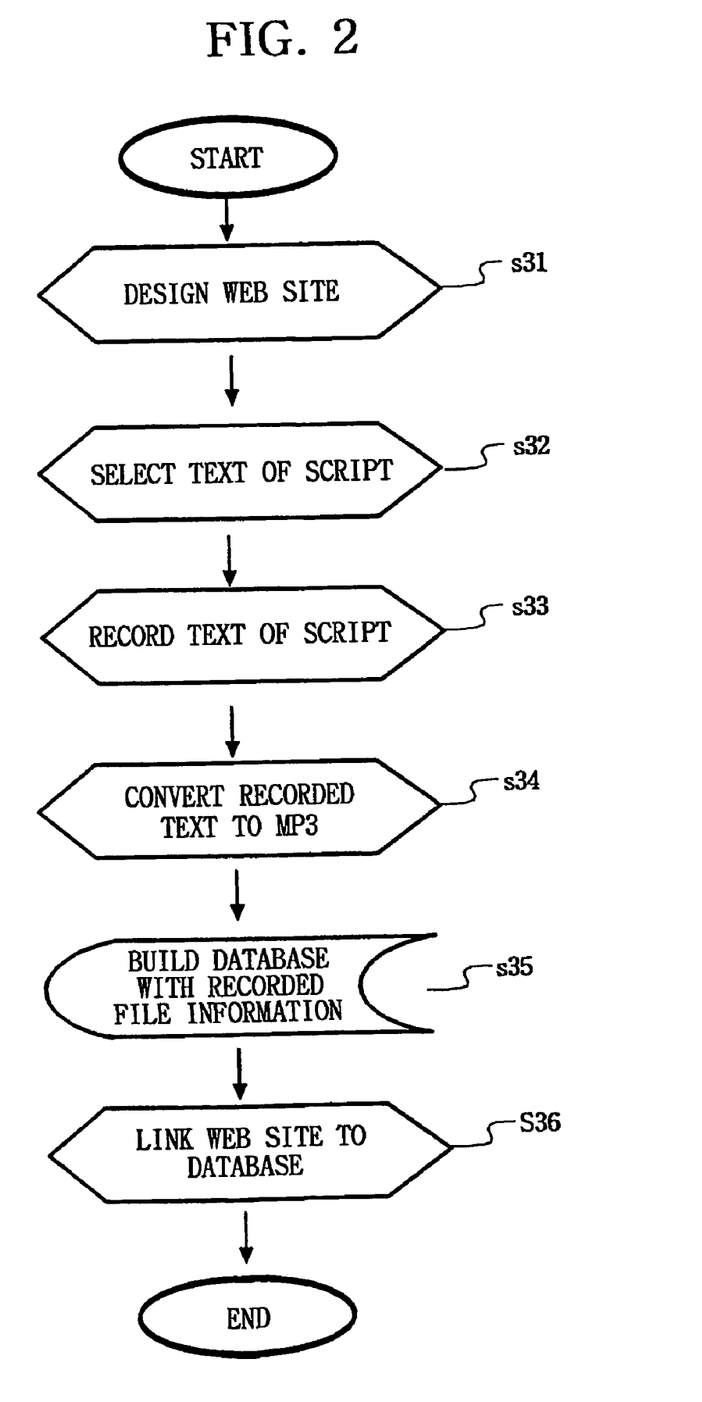
FIG. 2 is a flowchart illustrating the process of making a content-providing web page and contents therein.

FIG. 2 is a flowchart for illustrating a process for making the content-providing web page and content provided in the web page (document). First, a plurality of the content-providing web documents functioning as content-providing means are designed (step S31). Preferably, the content-providing web documents are dynamically generated by the server with a web/DB linking module in a hypertext language such as HTML and a script language such as ASP, depending on the user's preference. The dynamical content-providing web documents may be produced by linking URLs of the content files corresponding to user selection information 24 through 27 to predetermined content title buttons 28 and 29 of a predetermined content-providing web document form (template pages). Alternatively, content file information corresponding to user selection information 24 through 27 is retrieved with index information of the retrieved information (such as the titles of content, etc.) being provided as a content selection means linked to URL through the board type web pages. Other types of content-providing web pages may be easily made using the methodology described herein combined with well-known web/DB linking technology.

Alternatively, a plurality of static pages (not shown) having a plurality of predetermined content selection means (icons) linked to the URLs of content files are prepared and stored in the storage device while being classified by category. The static web pages may then be searched and provided through a separate search page according to the user's selection. Specifically, the search page may allow a search of the desired content-providing web documents in a hierarchy based on subject words classified by category as done, for example, by Yahoo (www.yahoo.com). Furthermore, the search page may include key word searching that provides a plurality of content-providing web page information resulting from a key word search, and desired web documents upon user's selection as in Yahoo. In addition, in the case of a server providing text-based content, the server naturally provides a text-based menu (display) file (not shown).

Learning materials (scripts) to be recorded are transformed into digital content that is provided through the web site (step S32). The scripts can be any type of material useful to language-learning, including the Bible, novels, fairy tales, words of a song, poem and chant scripts. Preferably, the scripts may be selected not to infringe any copyright.

The chosen scripts are then recorded (step S33) by several persons, i.e., a man, a woman and children, etc., having different voices at a different speech rate, i.e., normal, slow and very slow, etc., in different languages, i.e., English, Japanese and Chinese, etc. Preferably, the recordings are made by native speakers. The script is recorded in such a manner to allow playback and editing by computers or recording devices (an audio content producing means). Next, if the content is analog-type audio content, the recorded audio content is converted into a digital audio content file and encoded into various digital file formats such as real audio files (ram, ra) and a mp3 files in order to be played by on-line playing means (Real Audio, etc.) or off-line playing means (Real audio, WinAmp, mp3 players, etc.). In doing so, the audio content files are classified for the content database of FIG. 3 and the said content-providing web page, and stored in server's storage device (medium) (step S34).

Figure 3:
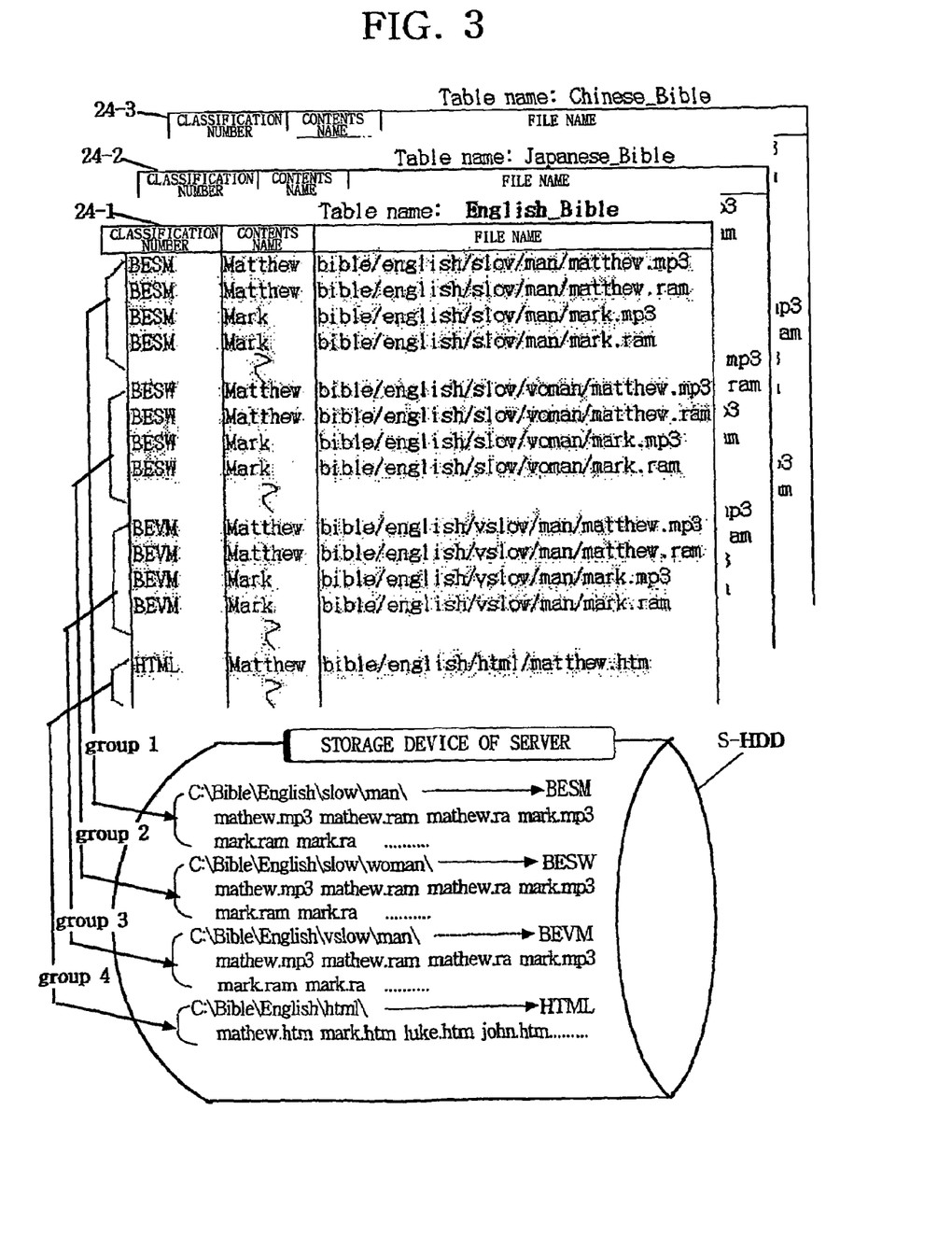
FIG. 3 illustrates a preferred embodiment for building a content DB that is provided on a content-providing web page, and for illustrating data attributes.

The file information of the stored content which is classified and labeled as in FIG. 3 is built into a database as shown in FIGS. 3 and 4 for enabling convenient search and administration of the content files (step S35). The file information is used by control module pro1 and DB server pro2 to search the content file URL information.

The URL information of the content file produced by the above procedure is then linked to the content-providing web documents designed in step S31, so that when the user clicks on a desired content button 28 of the web documents, corresponding content file is played during streaming or downloaded in the user terminal (step S36).

In step S34, conventional technologies are used for the conversion of audio files to be played on-line (ram, ra, etc.) or off-line (mp3 files, etc.) An example of the embodiment of the conventional technologies is as follows. The audio content files produced in step S33 are changed into window wave files (*.wav) using a conversion program as available from the sound-card manufacturing companies, etc. or conventional multimedia producing tools, and then encoded, e.g., into Real audio files by Real Producer of Real Network company (www.realnetworks.com), and into mp3 files by various kinds of mp3 encoder programs (such as MP3 Enc 3.1, etc.). Alternatively, the script may be recorded directly into the digital audio files such as Real audio files by special recording devices. In this case, the digital audio content files are edited to be suitable for the content-providing web documents of step S31 and then stored in the storage device in the server as in the step S34.

Web documents to be used for content-providing means are designed in step S31. In steps S32 and S33 audio content is produced by audio content producing means (unit) 4a. A digital audio content database to provide the produced audio content through the web documents is built in steps S34 and S35. In step S36, executable content-providing web documents are produced by linking the URL of the digital audio content to the designed content-providing web documents. Although, step S31 may be implemented after the step S35, preferably, it occurs prior to step S35.

FIG. 3 shows a preferable embodiment of the method of building a content DB with an attribute table provided in the content-providing web documents of FIG. 1b. However, the present invention is not limited to the embodiment of FIG. 3 with various modifications depending on the searching method of control module pro 1.

With reference to FIG. 3, Bible content DB includes the URL information tables linked to the script files and the digital audio files in at least English, Japanese and Chinese. The server's storage device (S-HDD) stores the digital audio files corresponding to the URL information. In this embodiment, three language versions of digital audio files can be provided, each having different attributes with respect to the scripts for each language (each version of the scripts for a given language has the same meaning). Each language version of the digital audio files can be easily retrieved in the same attribute group using a classification number. Directories of the server storage device (S-HDD) in which the digital audio files are stored are named corresponding to the classification number of the table.

Although in the example of FIG. 3, only ram files and mp3 files are shown as the on-line and off-line playable files, any type of on/off-line playable files can be adopted in the present invention as is understood by those skilled in the art.

Reference numerals 24-1, 24-1 and 24-3 represent tables of the Bible DB. An English_bible table with the field attributes and the information stored in records is shown according to the user's selection in language selection item 24 of FIG. 1*b*. In each record of the English_Bible tables, the URL (uniformed resource locator) information is presented as 'file name' indicated the precise location of special content file in the server storage device (S-HDD). Classification numbers are also present in each record as an identifier of the record. The 'classification number' of FIG. 3 consists of alphabet initials of the DB name, the name of the table, the speech rate, and the kind of voice, etc., thereby enabling a rapid and accurate retrieval of record groups having the same attribute upon selection of user selection items 24 to 27. This also allows dynamical linking of the URL corresponding to digital audio content file to the content button 28 of the content-providing web document. The script file (see 29-1 in FIG. 4) is labeled "HTML" since this file is in the HTML format. Alternatively, the script file may be in another format that is useful when the user terminals are wireless devices. The 'content name' is given the name attribute of content button 28 of the content-providing web page for conveniently dynamically linking to content button 28 by the web/DB module. The 'file name' indicates the URL of content files in the server storage device (S-HDD) so that the file name is dynamically linked according to 'content name' with the content button 28 of the Bible content-providing web documents in FIG. 4. A 'ra' file streamed during playing is stored in the same directory where ram files are typically stored when sent to the user terminal by streaming programs (such as Real audio and Window media player, etc.). In accordance with this embodiment of the present invention, one skilled in the art is able to make control program pro1 as well as content-providing web documents linked to a content file information database as described in step S31 of FIG. 2.

FIG. 4 illustrates the dynamical production of content-providing web documents. The following components are provided for use with this production: content-providing web documents 20-1, control module pro1 (i.e., web/DB linking module) stored in the web server 4 for transmitting and receiving data to/from a browser, a plurality of database 22-1 and 23-1 where content URL information is stored, a DB server pro2 (such as DBMS) to support building the content database and retrieving the same, and a storage device (S-HDD) where a plurality of content files linked by the content buttons (icons) of the content-providing web documents are stored. Content-providing web document 20-1 provides digital audio Bible content according to the user desires by operation of the control module. Each content DB includes URL information tables of content files in several languages providing each user with content in different language for a given script. The processes includes following steps:

(1) The step of selecting a database: Reference numerals 22 and 23 indicate menu icons that are linked to the corresponding content databases 22-1 and 23-1 having the same name provided by web documents. When the user clicks on (or selects) the desired menu icon with a mouse, the content-providing web document 20-1 linked to the selected menu icon is displayed on the right frame. FIG. 4 shows the state of content-providing web documents 20-1 providing customized digital audio content linked to the Bible DB. This information is displayed on the right frame of user browser 20 upon the user pressing the Bible menu icon 22. As a result, control module pro1 receives information indicating that the user has selected the Bible DB 22-1 linked to the content DB menus in the web documents.

(2) The step of selecting content attribute: In this step, the user selects content having the specific attributes the user desires. The selection is made through a plurality of content attribute selection items 24 through 27 which correspond to content having differing attributes with respect to the same script of the Bible. The selection items include language 24, the speed of speech 25, voice tone 26 and playback device 27. When selecting an item, the user clicks on the drop-down buttons 24A, 25A, 26A and 27A, and chooses values for the attributes of language, speed, voice and playback device in list boxes 24L, 25L, 26L and 27L.

(3) The step of sending the selected information of the content attributes: The user selects 'English' in language 24, 'slow' in speech speed 25, 'women' in voice 26 and 'mp3 player' in playing devices 27 as in FIG. 4. The user clicks on a search button 20-2 in the web document 20-1 to send the selected information to the control module of the web server;

(4) The step of dynamically producing the content-providing web document: The control module dynamically produces the web document such as the Bible content-providing web document 20-1 in which content buttons are linked with the content file's URL information corresponding to the content attribute information sent by the user. This document is displayed on the user's terminal, as illustrated in the following sub-steps:

(a) The step of confirming the selected information by user and opening the DB; the control module confirms the attribute information of the content selection while verifying that, for example, 'The Bible' is selected in the DB, 'English_Bible in table, 'slow' in speech speed, 'woman' in voice, and 'MP3 player' in the playing device.

The Bible DB is opened in this step:

(b) The step of linking an audio file is performed through the following steps:

(b-1) the step of retrieving records of the same attribute; the control module verifies and combines the user selection information to retrieve records having the same attribute from the table of English_Bible 24-1 of FIG. 3 pursuant to classification number and extension name of file, e.g., 'mp3' to MP3 player and 'ram' to Real Audio. The 'classification number' is marked 'BESW' (The Bible-English-Slow-Woman) in consideration of the combination of user selection information as in the table of FIG. 3.

(b-2) the step of linking the content button 28 of the web documents to the retrieved file name; the content button 28 of the Bible content-providing web document 20-1 in FIG. 4 is linked to the URL of the corresponding audio content file name selected from the group 2 retrieved in the step (b-1). The button is preferably named with the 'content name' of table 24-1 of FIG. 3.

(c) The step of linking script file; the script file is stored in the form of, for example, 'HTML' in group 4 as shown in table of FIG. 3. The script button 29 of the Bible content-providing web document in FIG. 4 is linked to the URL of the corresponding script file name selected from the group 4. Preferably, script button 29 is named with the 'content name' of table 24-1 of FIG. 3. Next, the customized content-providing web documents is dynamically produced and provided to the user. The dotted line between 28 and 28-1, and 29 and 29-1 in FIG. 4 indicates the linkage between content buttons of the produced content-providing web documents 20-1 and corresponding digital content files.

As set forth above, control module pro1 retrieves URL information of a content file according to the user's selection, producing the web document where the content buttons (icons) are linked to the corresponding URL information. It should be appreciated that alternative methods of producing dynamic content-providing web documents executed by the web server or the central processing unit (CPU) of the server instead of the control module pro1 are know to those skilled in the art.

Thus far, only one example of a web/DB linking module for dynamically producing customized content-providing web documents linked to a database and used as the customized content-providing means is described. However, the customized content-providing means may include other types of web/DB linking web documents such as board-type web documents as described in step S31 in FIG. 2. Moreover, the content-providing web documents only link with the URL information a single file of type 'ram' or 'mp3' depending on the selection for the playing device 27 made by the user. However, in actual cases, it may be desirable that the content-providing web document has content-providing buttons for both on-line and off-line files. Accordingly, it takes a long time to provide the file (mp3) for off-line play upon the user's request for a file having the same attributes (with regard to language, voice and speed) as that of the on-line file (ram), because the server must dynamically produce a web document linked to the URL of an off-line file. The content-providing web documents preferably have buttons for both on-line and off-line file. Moreover, the searching operation of the control module (i.e., retrieving content files having the attributes corresponding to user selection) described above should be regarded as one of the preferable embodiments. In a realistic case, the retrieving method of the control module may be varied according to the methods of building the content file information DB and/or producing the content-providing web documents as is understood by those skilled in the art.

Figure 5:
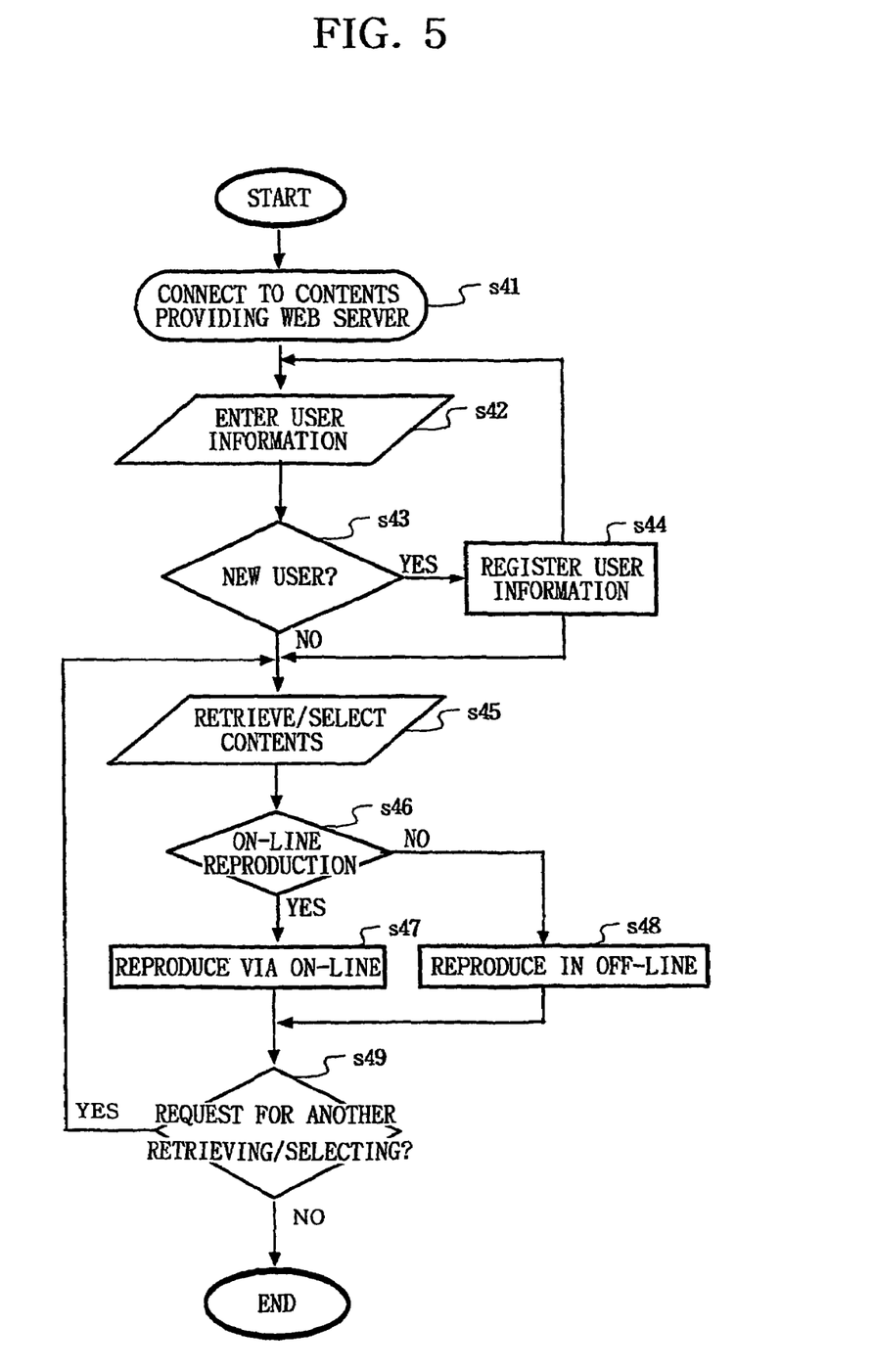
FIG. 5 is a flowchart illustrating the process of a user using provided content in the present invention.

FIG. 5 shows a flow chart illustrating the procedure by which the user uses content in the web site of the present invention which is programmed into code executed by a computer and stored in the server's storage device. The user connects to the web site of the content-providing web server 4 using terminal 1 or 2 equipped with a web browser 20 via wired/wireless Internet 3 (step S41). Upon being connected to the server, the homepage of the web site is downloaded to the user terminal and displayed through the web browser. The user then enters the user information and then logs-on by a user information input means in the homepage (step S42). The web server's CPU verifies whether the user information is registered in the stored database, and if it is, step S45 (step S43) is executed. If not, the server registers the user information in the database and then either goes back to step S42 to request log-on again or proceeds to step S45 (step S44). When the user enters content title (such as content DB name, etc.) and desired content attribute information as searching keywords into the content-providing means (web documents) of the web site, the CPU retrieves (or dynamically produces) the content-providing web document corresponding to the user selection information and sends it to the user terminal enabling the user to click on the content button 28 if desired (step S45). The invention is characterized in that the content button is linked to one of a plurality of contents which are different from one another in at least one attribute regarding languages, voices, the speech speed, and playback device. However, although the attributes vary, the meaning of the script associated with the content is the same. When the content file linked to the selected content button 28 is downloaded to the user terminal, the CPU of the terminal determines whether the content file can be played in streaming mode (step S46). If the downloaded file is an on-line playable file 28-2 such as a 'ram' file, a streaming content playing program installed on the user terminal (such as Real Audio) is automatically executed to play the streaming file (ra) linked to the ram file on the server's storage device (step S47). Moreover, if the downloaded file is an off-line playable file such as a 'mp3' file, the content file is played by a corresponding content playing program (e.g., WinAmp, etc) installed on the user terminal whenever desired by the user. In this latter case, the content file may be transferred to portable playing devices such as MP3 players and then played (step S48). In the step S49, the sequence goes back to the step S45 or terminates. Furthermore, the menu in voice tone box 26L may list real names of performers instead of terms such as man, woman, old, and young described in FIG. 2.

FIG. 5 shows that the invention provides on-line/off-line content having different attributes selected by the user. Such attributes relate to the same script and include voice and speed of speech. A listener listens repeatedly to a foreign language according to their level of knowledge. Moreover, this process can also be applied to other languages.

The present invention is characterized by comprising the user selection items 24 through 27 by which the user chooses desired content with language (English, Chinese, and Japanese, etc), the speed of speech (normal, slow, and very slow, etc), voice tone (man, woman and children, etc), and playback device (on-line or off-line playback) corresponding to the same script according to her/his taste, level, and environments. Accordingly, the users can easily configure the customized learning material (content) by themselves at lower cost, dynamically and easily.

The content-providing web pages (documents) or content DB menu pages which function as content-providing means can be customized by a registered user by the method comprising the steps of:

(1) Building a content use information DB that includes file names of the content-providing web documents which have been provided to the user; content attributes selected by the user in web documents; and registered member number (identifying number) used for key word searching. Accordingly, the DB consists of a combination of use information obtained from the content-providing web documents depending on the user. The content use information DB is built by the user choosing and registering specific content-providing web document using a registering means provided by the server. Examples include a shopping cart function linked with the content use information DB of the server. When logging off the web site, recently used content-providing web documents use information may be automatically stored (or registered) in the storage device according to the user identifying number. Furthermore, registered information preferably may be automatically removed when the predetermined storage capacity for information is full; and (2) Searching user's content use information from the content use information DB when the user logs in the web site and dynamically restoring (producing) the customized content-providing means (home page) to which the user has recently accessed by combining the use information with a template web documents form (which is prepared and stored in the server) linked to web/DB linking module. This enables the user to receive the content that he/she has recently used.

The customized content-providing means (home page) has a function for recalling the content having specific attributes that the user received recently when the user logs onto the web site, which brings a lot of convenience regarding the necessity to use the customized content for learning foreign language repeatedly. Particularly, such a function is useful for wireless terminals because the wireless terminals are inferior to desktop computers in the size of display, communication rate and input means. The capacity storage for the content-providing web documents use information stored in the content use information DB is preferably limited to the predetermined value for each user. Also, the registered content-providing web documents use information may be deleted manually by the user through the content-providing homepage.

A second embodiment of the present invention is directed to a method of building a large quantity of audio content at low cost. This embodiment directly relates to the fourth object of the invention set forth above. Audio content having several user selectable attributes corresponding to the same script of content are usually expensive. Two methods are provided to solve the above problem.

In one method, users produce and upload the audio content on a warehouse-board of the web site. Users that provide content in this manner may be paid by the service provider or rewarded in some other way. The method may be performed as follows:

(1) The web site provides a user-produced content registering means. The user producing content registering means include a means for providing a user with the content information to be registered; content producing tools in program; and a means for uploading the produced content, e.g., a warehouse-board. The content information to be registered includes the corresponding content-providing web documents file and the script to be recorded for the content-providing web documents; content attribute information such as language, voice and speed of speed, and the information for the method in which to produce content.

(2) The user confirms the content to be registered and receives a script to be recorded by searching and receiving the content-providing web documents page that provides the script file. Next, the user records the script using a recording device to make an audio content file. If necessary, the audio content file is encoded into digital files with a program (such as a content producing tool). The user-produced content is then uploaded on the predetermined ware-house of the web site. At this time, the user may download content producing tools for encoding and editing content from the web site. Preferably, when uploading the audio content file, the attribute information of the file and personal information of the provider are recorded.

(3) The uploaded audio content file is then verified by the website administrator. If necessary, the audio content file is amended using suitable content producing tools to conform with the requirements of the content-providing web documents. The audio content files are stored in the related DB to be linked to the corresponding web documents.

In another method, the customized content DB may be built by cooperation of branch web sites in various countries, as follows:

(1) Main website playing a central role is prepared. The main website provides content for learning foreign languages available to users all over the world. Although, digital audio content DB is mainly provided in English, a determination is made whether content of other languages should be produced and made available. In this step, no particular language is preferred.

(2) The main website is used to collect local companies located in various countries. Each local company builds a local branch website using the present invention such that a content DB in each native language is built. Each content DB includes content corresponding in meaning to the English-version built by the main site. The content of the main website as well as content of other branch webistes are made available by suitable selection of content attributes 24 through 27 in FIG. 4. Furthermore, a local branch builds its own language content DB in languages of both the branch's country and English, thereby providing users with selection items via web documents.

(3) The main site links the content DB in each native language to the user selection items to provide the user with content in various languages according to a user selection. Also, each local branch site links the content in various languages to its content-providing web documents or receives the content-providing web documents linked to the content in various languages from the main website to append to its own site.

The method of this embodiment (technology) enables production of various and sufficient content in various languages at low cost wherein each branch configures the customized content-providing system while only producing content in its own language. Preferably, local sites make the homepage interface (menu) pages in English as to be able to use the original web documents sent from the main site. The user is then provided with customized content in various languages through any of the local sites. In the above case, it is desirable that the users register their membership information in each country's sites as required by the appropriate service fee. Finally, certification of user between the sites may be performed through site address information, etc., recorded in a cookie received from the site when the user logs in.

The Third Embodiment

In a third embodiment, the invention is applied to the music field, enabling the user to learn foreign languages through songs and chants with ease in an enjoyable manner. For example, if a person can sing a certain hymn in Korean, he is able to easily learn the corresponding hymn in other languages of the musical note and song words. Furthermore, a user may effectively learn songs as well as recite song words in foreign languages if provided with audio content and the corresponding musical notes and song words files in various languages.

The method of this embodiment comprises the steps of, (1) Building music content DB consisting of a plurality of music document files (which includes the files of musical notes and song words) in various language; and a plurality of corresponding music audio files to be played in an on-line or off-line mode produced by recording the performance of the music document files by various performance means such as musical instruments of voices.

(2) Building a chant content DB by performing the 'song words' with only the rhythm and beat of a musical note, without the melody of a musical note, with various voices with/without musical instruments, and recording it into on-line/off-line playable digital audio file format, wherein, the chant is preferably performed by the professionals. The 'song words' include the rhythm without a melody, which, in short, consists of a rhythm and a beat with the length of a musical notes (without the melody of the musical note). Song words or sentences such as fairy tales can be performed like a song by adopting the characteristic of a song with respect to rhythm and beat as is described in a master's thesis entitled 'Teaching Listening and Speaking through Song and Chant', Yun-Ah, KIM, a graduate school of education in Seoul National University of Education, 2001. 2.

(3) Linking the chant content DB and musical content DB in the music content-providing web documents using the technology set forth above in FIG. 4. An additional user selection item for the performance type is added to the content-providing web documents in FIG. 4. The list of performance selection items include vocal music with or without musical instruments, piano music, orchestra music, etc., and/or a chant in compliance with the score. The produced audio files (music files and chant files) are linked to the corresponding selection list of the performance type.

(4) Providing users with the customized music content through the music content-providing web document.

The configuration of the system in the present embodiment is the same as that of the customized language-learning content-providing system set forth above. In summary, the customized music content can also be provided through the same system.

Characteristics of the present embodiment may be appreciated by the following procedures performed by a user:

(1) The user logs onto the web site (homepage) and selects the music content-providing web document;

(2) The user selects English in language selection 25 and vocal music in performance-type selection in the user selection items of the music content-providing web document for learning a well known hymn in English which corresponds to a Korean version. The user is thereby provided with the corresponding music content-providing web document from the server. Next, the user clicks on the script button for the musical notes to be popped up in a separate window. The user listens to the vocal music of the selected song by clicking on the content button as desired; and (3) The user is unfamiliar with the English hymn so as not to be able to listen to and/or understand the words of the song; and (4) Therefore, the user switches the performance-type into a chant performance to receive the corresponding music content-providing web document from the server. The user tries listening to and following the chant several times while looking at the script of the musical note and/or song words by selecting the desired content buttons. As a result, the user can be familiarized with the song words and rhythm of the musical note, which enables the user to enjoy vocal music according to the above steps.

The present embodiment is not limited to the situations set forth above. For example, members of different groups of a chorus should repeatedly practice a specific section. Therefore, a person playing a piano or the like typically must repeat the same song for each group. Members of each group that are practicing must wait their turns being unable to practice with the piano player. The present invention solves such problems by providing the selection for the performance type which includes vocal music such as alto, soprano, base, tenor or the like, and various musical instruments in the music content-providing web page. Therefore, an individual or a group can practice a song and/or a chant at any place and at any time in on-line or off-line mode according to user's desire.

As set forth above, the present invention by which content for learning foreign language is produced and provided by a server has advantages as follows:

1. Educational audio content corresponding to the script content can be customized with ease and effectiveness according to user's desire and preferences regarding language, voice, speed of speech, and listening environment.

2. The user can repeatedly listen to the content with respect to the same script in various languages, voices, speeds of speech or the like at any place and at any time, facilitating the improvement of recitation of script, listening and pronunciation, etc., according to the invention.

3. The voices of common native speakers can be commercialized with a high value thereby making mass production of foreign language-learning audio material (content) possible. Also, it is possible to decrease the cost of content production because various language-version content can be produced by native speakers in local websites in a number of countries and provided by linking them by means of user selection items that include language selection items 24. As a result, the user can have access to various content for learning foreign language at a low expense.

4. Since the user can receive the customized language-learning content in various languages at the same time, the user can learn various foreign languages with ease, fun and convenience.

The present invention has been described in detail. However, it should be understood that the detailed description and specific examples (which indicate preferred embodiments of the invention) are given by way of illustration only, since various changes and modifications within the spirit and scope of the invention will become apparent to those skilled in the art from this detailed description.

INDUSTRIAL APPLICABILITY

The present invention may be used in the music field as well as other language-learning fields to produce and provide customized digital audio content at a low cost in a facile manner as set forth above.

What is claimed is:

1. A system for providing customized audio content, comprising a content database and a content-providing server connected to a wired or wireless communication network, the content database comprising digital content for language learning or musical learning, each content comprising:

a plurality of digital audio files each associated with an equivalent script file, the plurality of digital audio files being characterized by one or more audio attributes such that each audio file of the plurality of audio files differ in a least one audio attribute from other digital audio files associated with the equivalent script file, the digital audio file and the script file being linked to each other wherein the audio attributes include a playback device attribute and at least one attribute selected from the group consisting of a musical performance type attribute, a language attribute, a voice attribute, and a playback speed attribute; and the server operable to:
receive user selected audio file attribute selection information,
retrieve an audio file or script file corresponding the selection information from the database; and
provide the retrieved audio file or script file to a user.

2. The system of claim 1, wherein the digital audio file and script files are linked together by a content-providing means, the content-providing means comprising:
a GUI-based display file or text-based display file linked with content menu information equipped with an attribute selection means that includes a component selected from the group consisting of a voice attribute selection means, a playback speed attribute selection means, a musical performance type attribute selection means, and a playback device attribute selection means.

3. The system of claim 2, wherein the content-providing means includes a musical performance type attribute selection means wherein the scripts are musical note files, the audio files are files made by recording vocal music, musical instrument music or chanting, and the performance type attributes selection means specifies if an audio file is vocal music, instrumental music, or a chant, the vocal music being a soprano tune, an alto tune, a base tune, a tenor tune or a chorus tune with or without musical instrument accompaniment.

4. The system of claim 2, wherein the server further comprises a means for:
providing a user terminal with the content menu information that is selectable by the user wherein the content-providing means is linked to selected content menu information;
receiving selected audio file attribute information through the content-providing means from the user terminal;
linking the content-providing means with an URL of an audio file corresponding to received audio attribute information or an URL of a script file for a second recording corresponding to language attributes of the audio file; and
retrieving the audio file or the script file requested by the user through the content-providing means.

5. The system of claim 2 wherein the server further comprises a user-produced content register, the user-produced content register operable to
provide the user with content information to be registered;
up-load user-produced content; and
store up-loaded content in a database.

6. The system of claim 5 wherein
the user is provided content information to be registered by a bulletin board, the information of the content to be registered is information related to a content-providing documents file, the script for sound recording, or the requested audio attribute of the content.

7. The system of claim 1, wherein the content is provided from a user or local branch content-providing servers located in a plurality of countries.

8. The system of claim 1 wherein the content-providing server comprising:
a main content-providing server and one or more local branch content-providing servers located in one or more countries,
each branch server able to access the content of the main server or other branch servers in order to optionally build a database in each native language corresponding in meaning to the content on the main server or other branch server wherein the local branch servers are operable to build content databases that are accessible to the main server or other branch servers.

9. The system of claim 1 wherein the server is operable to provide a customized interface to each registered user on the basis of the information accessed recently or registered by the registered user.

10. The system of claim 9 wherein the customized interface is provided by a component comprising:
a content use information database that stores identifying information on the content-providing server, the identifying information including selected audio attribute information;
database linking template documents files; and
a means for producing and providing customized interface by dynamically combining user's content use information retrieved from the content use information database with the database linking template documents file when the user logs onto the server.

11. The system of claim 1 wherein the content database further comprises an index file, the index file storing index information comprising:
a classification number and a content name corresponding to attributes of the audio file or the script file; and
a file name that indicates an URL including the stored location of the audio file or script file in a server storage device, corresponding to the classification number or content name or combination thereof.

12. A method for providing customized content with a system comprising a content database and content-providing server connected to wired or wireless communication network,
the content database comprising digital content for language learning or musical learning, each content comprising:
a plurality of digital audio files each associated with an equivalent script file, the plurality of digital audio files being characterized by one or more audio attributes such that each audio file of the plurality of audio files differ in at least one audio attribute from other digital audio files associated with the equivalent script file, the digital audio file and the script file being linked to each other wherein the audio attributes include a playback device attribute and at least one attribute selected from the group consisting of a musical performance type attribute, a language attribute, a voice attribute, and a playback speed attribute, the method comprising:
(a) providing a user terminal with user selectable content menu information user can select;
(b) receiving selected audio file attribute information through the user terminal; and
(c) retrieving an audio file or a script file corresponding to the selected audio file attribute information.

13. The method of claim 12 wherein the digital audio file and script files are linked together by a content-providing means, the content-providing means comprising:
a GUI-based display file or text-based display file linked with content menu information equipped with an attribute selection means that includes a component selected from the group consisting of a voice attribute selection means, a playback speed attribute selection means, a musical performance type attribute selection means, and a playback device attribute selection means.

14. The method of claim 13 wherein the content-providing means includes a musical performance type attribute selection means wherein the scripts are musical note files, the audio files are files made by recording vocal music, musical instrument music or chanting, and the performance type attributes selection means specifies if an audio file is vocal music, instrumental music, or a chant, the vocal music being a soprano tune, an alto tune, a base tune, a tenor tune or a chorus tune with or without musical instrument accompaniment.

15. The method of claim 13 wherein the content is provided from a user or local branch content-providing servers located in a plurality of countries.

16. The method of claim 13 further comprising the step of registering user-produced content, the user-produced content registering step comprising the steps of:
provide the user with the information of the content to be registered;
up-loading the user-produced content; and
storing up the up-loaded content in a database.

17. The method of claim 16 wherein the user is provided content information to be registered by a bulletin board, the information of the content to be registered comprising information related to a content-providing documents file, the script for sound recording, or the requested audio attribute of the content, and wherein the step of uploading includes registering of the user-produced file, indexing information that includes audio attributes, and the user's personal information.

18. The method of claim 12 wherein the content-providing server comprises:
a main content-providing server and one or more local branch content-providing servers located in one or more countries,
each branch server able to access the content of the main server or other branch servers in order to optionally build a database in each native language corresponding in meaning to the content on the main server or other branch server wherein the local branch servers are operable to build content databases that are accessible to the main server or other branch servers.

19. The method of claim 12 further comprising providing a customized interface to each registered user on the basis of the information accessed recently or registered by the registered user.

20. The method of claim 19 wherein the step of providing customized interface comprising the steps of:
building a content use information database that stores identifying information on the content-providing server, the identifying information including selected audio attribute information; and
producing and providing customized interface by dynamically combining user's content use information retrieved from the content use information database with a database linking template documents file when the user logs onto the server.

21. The method of claim 12 wherein the content database further comprises an index file, the index file storing index information comprising:
a classification number and a content name corresponding to attributes of the audio file or the script file; and
a file name that indicates an URL including the stored location of the audio file or script file in a server storage device, corresponding to the classification number or content name or combination thereof.

* * * * *